(12) United States Patent
Bi (10) Patent No.: US 10,201,004 B2
(45) Date of Patent: Feb. 5, 2019

(54) COORDINATED BLUETOOTH—WIFI SCHEDULING WITH BLUETOOTH SLOT AVAILABILITY MASK

(71) Applicant: Intel IP Corporation, Santa Clara, CA (US)

(72) Inventor: Dongsheng Bi, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 113 days.

(21) Appl. No.: 15/280,187

(22) Filed: Sep. 29, 2016

(65) Prior Publication Data

US 2018/0091929 A1   Mar. 29, 2018

(51) Int. Cl.
| | |
|---|---|
| *H04W 72/12* | (2009.01) |
| *H04L 5/00* | (2006.01) |
| *H04W 16/10* | (2009.01) |
| *H04W 16/14* | (2009.01) |
| *H04W 72/04* | (2009.01) |
| *H04W 74/04* | (2009.01) |
| *H04W 72/10* | (2009.01) |

(Continued)

(52) U.S. Cl.
CPC ....... *H04W 72/1205* (2013.01); *H04L 5/0001* (2013.01); *H04L 5/0078* (2013.01); *H04W 4/80* (2018.02); *H04W 16/10* (2013.01); *H04W 16/14* (2013.01); *H04W 28/0205* (2013.01); *H04W 28/06* (2013.01); *H04W 72/0446* (2013.01); *H04W 72/10* (2013.01); *H04W 72/1215* (2013.01); *H04W 72/1242* (2013.01); *H04W 72/1257* (2013.01); *H04W 72/1263* (2013.01); *H04W 74/04* (2013.01); *H04J 3/0685* (2013.01); *H04W 84/12* (2013.01); *H04W 84/18* (2013.01); *H04W 88/06* (2013.01)

(58) Field of Classification Search
CPC ............ H04W 72/0446; H04W 72/10; H04W 72/1205; H04W 72/1215; H04W 72/1242; H04W 72/1257; H04W 72/1263; H04W 28/0205; H04W 28/0215; H04W 28/0268; H04W 28/06; H04W 56/001–56/002; H04W 74/04; H04W 16/10; H04W 16/14; H04W 4/80; H04W 84/12; H04W 84/18; H04L 5/0001; H04L 5/0078; H04J 3/0685
See application file for complete search history.

(56) References Cited

U.S. PATENT DOCUMENTS

| | | | | |
|---|---|---|---|---|
| 2009/0180451 | A1* | 7/2009 | Alpert ............... | H04W 72/1215 370/338 |
| 2011/0097998 | A1* | 4/2011 | Ko .................... | H04W 72/1215 455/41.2 |

(Continued)

*Primary Examiner* — Joshua Kading
(74) *Attorney, Agent, or Firm* — Schiff Hardin LLP (57) ABSTRACT

A method and apparatus for coordinating communications between a Bluetooth system and a WiFi system in a device. Requests for airtime are collected from the Bluetooth system and the WiFi system. A local slot availability mask is prepared showing time slots allocated to the Bluetooth system. The local slot availability mask is forwarded to the WiFi system so that the WiFi system may avoid sending and receiving WiFi wireless communications during time slots allocated for Bluetooth system use. The WiFi system may override the Bluetooth allocation when needed. Changes in priority of the Bluetooth communications and of the WiFi communications result in changes in allocation of time slots.

13 Claims, 6 Drawing Sheets

(51) Int. Cl.
   *H04W 28/02*   (2009.01)
   *H04W 4/80*    (2018.01)
   *H04W 28/06*   (2009.01)
   H04W 84/12     (2009.01)
   H04W 84/18     (2009.01)
   H04W 88/06     (2009.01)
   H04J 3/06      (2006.01)

(56) References Cited

U.S. PATENT DOCUMENTS

2013/0260686 A1* 10/2013 Mukherjee ............ G06F 9/5027
                                                    455/41.2
2016/0353470 A1* 12/2016 Liu ..................... H04L 65/4076
2017/0094677 A1*  3/2017 Liu ................... H04W 72/1215

* cited by examiner

| Name | Length (bytes) | Type | Unit | Detailed | Mandatory range |
|---|---|---|---|---|---|
| SAM_Submaps | 12 | | multiple-bytes | This parameter contains 48 2-bitfields. Only the first $N_{SAM-SM}$ fields are significant; the remainders are reserved.<br><br>The $n^{th}$ (numbering from 0) such field defines the submap type of the $n^{th}$ submap in the map.<br><br>The meanings of the possible values are:<br><br>0 = Each slot is individually available or unavailable as configured. Slots may have different availabilities for transmission and reception<br><br>1 = All slots are available for transmission and reception<br><br>2 = All slots are unavailable for transmission and reception<br><br>3 = Reserved for Future Use | |
| SAM_Type0-Submap | 14 | | multiple-bytes | This parameter contains 56 2-bit fields.<br><br>The $n^{th}$ (numbering from 0) such field defines the slot type of the $n^{th}$ slot.<br><br>The meanings of the possible values are:<br><br>0 = The slot is not available for either transmission or reception<br><br>1 = The slot is available for transmission but not reception<br><br>2 = The slot is available for reception but not transmission<br><br>3 = The slot is available for both transmission and reception | |

*Table 5.2: Parameters in LM PDUs. (Sheet 10 of 12)*

COORDINATED BLUETOOTH—WIFI SCHEDULING WITH BLUETOOTH SLOT AVAILABILITY MASK

TECHNICAL FIELD

The present disclosure relates generally to a method and apparatus for coordinating wireless communication, and more particularly to a method and apparatus for coordinating wireless Bluetooth and WiFi communications by a device.

BACKGROUND

With the popularity of small electronics such as smartphones, tablet computers, and ultra-book computers and with the desire to provide more functionality in a smaller space, there are more demands to combine multiple technologies with one another, for example, by integrating the technologies into a single die or chip. When technologies that operate on the ISM (industrial, scientific and medical) band, such as Bluetooth wireless communication and WiFi (wireless fidelity) wireless communication, are collocated, they can compete with each other for air time, either because they share an antenna or RF (radio frequency) chain or they interfere to each other. Bluetooth and WiFi circuits each operate on their own local network and each of these wireless technologies schedules its wireless traffic independently without consideration of collocated communication systems. This results in the two communication systems sometimes competing for the same airtime and results in some of the airtime not being utilized.

Even if the Bluetooth and WiFi systems are not collocated on the same chip, the coexistence and operation of both of these wireless technologies in the same device can result in the two wireless systems competing for airtime and resources.

DETAILED DESCRIPTION

Figure 6:
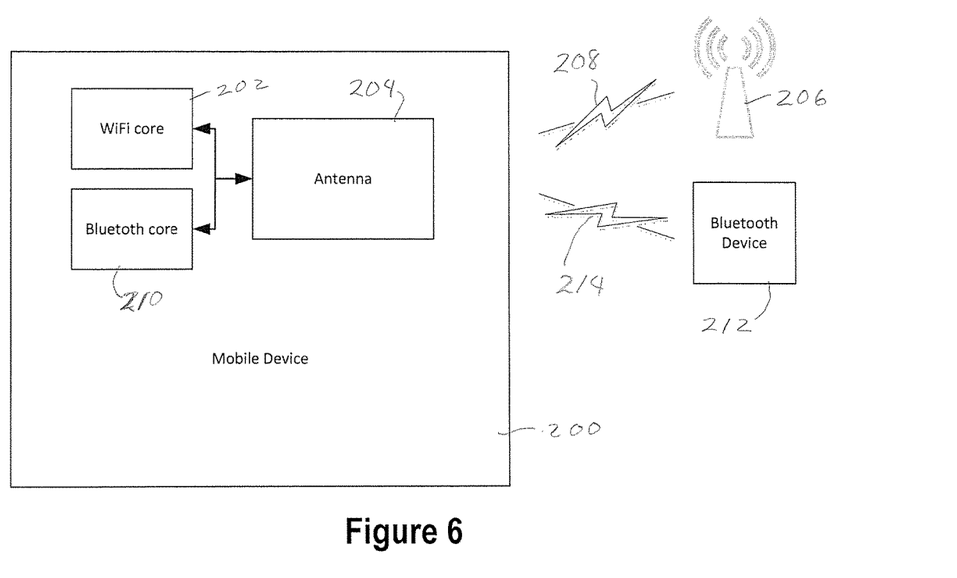
FIG. 6 is a functional block diagram of a mobile device using WiFi and Bluetooth communication.

Referring first to FIG. 6, a mobile device 200 includes a WiFi core 202 that communicates through an antenna 204 in the device 200 to a WiFi wireless access point 206. WiFi wireless communications 208 are carried out by the mobile device 200. The mobile device 200 also has a Bluetooth core 210 that communicates through the antenna 204 with a Bluetooth device 212. The Bluetooth device 212 may be a wireless handset, speaker, or other device. Bluetooth communications 214 are carried out by the mobile device 200. The WiFi communications 208 and Bluetooth communications 214 may interfere with one another if both are being used by the mobile device 200 at the same time. This is particularly true if they both communicate through the same antenna 204 or use some of the same circuitry.

The coexistence of Bluetooth and WiFi wireless technologies may be improved by coordinating the wireless traffic carried out by the two technologies. Airtime for the wireless communications are allocated in a coordinated way between Bluetooth and WiFi communications. Requests for airtime are collected from the Bluetooth and WiFi systems and used to generate a local slot availability mask for the Bluetooth system during which Bluetooth communications may be carried out. The slot availability mask is provided to the WiFi system so that the WiFi system may limit its communications during slots assigned for Bluetooth communications.

Coordinating the wireless communications or traffic of the Bluetooth and WiFi communications may increase airtime utilization, for example, by allocating time slots as needed and by each technology using its allocated slots. Coordinating the wireless traffic may save power since fewer partial packets are subject to packet kill or interference as a result of both systems attempting to communicate at the same time, as a result of which there are fewer killed or interfered packets to be retransmitted. Coordinating the wireless communications may improve communication reliability of the transmitted information and increase efficiency, for example, since fewer packets fail to be successfully communicated.

The coordinated scheduling between Bluetooth and WiFi communications addresses the coexistence problem between Bluetooth and WiFi, particularly although not necessarily where the Bluetooth and WiFi systems are in use by the same device. The Bluetooth and WiFi systems may be collocated within the device, for example, wherein the circuits are adjacent one another, or share the same physical space or area within the device, or share components or system modules, or are in another collocated relationship. The Bluetooth and WiFi systems may even be located on the same chip and, for example, may be formed within the same die.

In certain aspects, a method and system are proposed to allocate the airtime for transmission in a coordinated way between Bluetooth and WiFi communications instead of the two technologies competing ad-hoc with each other for airtime. The ad-hoc competition for airtime between the two communication systems is inefficient for information transmission and for scheduling of the wireless communications.

A slot available mask is a feature that is planned for introduction in the forthcoming Bluetooth 5.0 standard. According to the proposed standard, a master device and a slave device can communicate with each other on their future slots and conditions. This gives more information to the scheduler to schedule the traffic intelligently.

According to certain aspects of the present system and method, the Bluetooth slot available mask feature is utilized for the coordination of the Bluetooth (BT) and WiFi traffic. By regulating Bluetooth traffic with a slot available mask scheme the overall weighted joint throughputs are increased. When system or device is actively using or seeks to actively use the Bluetooth and WiFi systems at the same time, the system collects Bluetooth and WiFi bandwidth requests and generates a local slot available mask map for the Bluetooth communication so that the slot available mask may be used to regulate its local Bluetooth traffic within the allocated slots.

The Bluetooth slot available mask is provided to the WiFi communication system so that the WiFi system has advanced knowledge of the Bluetooth traffic pattern. The WiFi system may limit wireless communication traffic during time slots that have been allocated as Bluetooth airtime. By limiting WiFi traffic during time slots allocated to Bluetooth traffic, conflicts between the Bluetooth and WiFi communications are minimized and utilization of time slots that are not allocated as Bluetooth time slots are maximized by sending WiFi communications during airtime unoccupied by Bluetooth traffic.

The current known systems use ad-hoc packet level arbitration where higher priority traffic (either Bluetooth or WiFi traffic) wins over lower priority traffic (either Bluetooth or WiFi). The known ad hoc system results in packets which are in the process of being transmitted or received being killed during transmission even if the transmission is approaching the end of the packet. The airtime during which the killed packet was transmitted is wasted airtime. The killed packet must be retransmitted at a later time, resulting in delayed transmission of the packet and the use of more airtime for the packet transmission than would have been necessary without interference between the wireless communication systems.

By coordinating the wireless traffic between the Bluetooth and WiFi systems, the Bluetooth system may transmit and receive during the airtime assigned for Bluetooth communications and WiFi system may control the WiFi traffic within the airtime assigned for WiFi communications, if possible. The WiFi system may still use Bluetooth allocated time slots in certain situations.

With the coordinated scheduling of the Bluetooth and WiFi, a better user experience is provided for Bluetooth and WiFi coexistence use cases compared to the ad-hoc use under the old scheme. The coordinated scheduling approach also provides greater flexibility to adjust its operation to different use cases. For example, when both the WiFi system and the Bluetooth system are performing file transfers, the coordinated scheduling approach can achieve different respective WiFi and Bluetooth throughput performance levels by changing the amount of air time (changing the local slot available mask map) allocated to the Bluetooth system, as a result of which the WiFi system may take over the rest of the airtime not allocated to Bluetooth. In other words, the throughput of each of the Bluetooth and WiFi systems may be changed as needed.

Priority between Bluetooth communications and WiFi communication may be determined by traffic type. For example, one system is used for real time operation and the other for non-real time operation, the real time operation may have priority. In an example, if the Bluetooth system is to be used to provide a two-way wireless speakerphone using a HFP (hands free profile) and the WiFi system is being used for web browsing, the Bluetooth communication is assigned a higher priority than the WiFi communication.

In another example, a user may wish to use a wireless display device, which may use WiFi technology such as WiFi Direct, together with audio streaming using a Bluetooth A2DP (advanced audio distribution profile). Both the wireless display device and the Bluetooth A2DP technology have latency requirements. Interference between the technologies may impact performance. By properly allocating periodic airtime to the Bluetooth system (including providing for retransmission opportunities) to meet the latency requirement of the Bluetooth audio streaming, the WiFi system may take the rest air time. Because Bluetooth wireless traffic is known and predictable to the WiFi system, the WiFi system can utilize the remaining airtime.

Another advantage of coordinated scheduling of the Bluetooth and WiFi communication is that the system can know whether the requirements of both the WiFi and Bluetooth communications are met. The coordinated scheduling may prevent a downward spiral of competition for airtime between the two systems. For example, in the above described wireless display and A2DP use case, if the WiFi system reports low throughput on its allocated airtime, the WiFi system might decide to squeeze the Bluetooth allocated airtime to increase the small WiFi throughput. In other words, the WiFi system may begin using some or all of the Bluetooth requested or allocated time. The WiFi system may instead determine that the WiFi communications are experiencing bad channel conditions and that compromising the Bluetooth allocated airtime will not save WiFi use case. If that is the case, the WiFi system may not use the allocated Bluetooth airtime.

A slot available mask is one of new features of the forthcoming Bluetooth 5.0 SIG definitions which is targeted to help the Bluetooth and LTE coexistence problem. The SIG slot available mask is targeted to LTE/BT coexistence where both BT (Bluetooth) and LTE are working on a time slot or subframe scheme. The two system can be synchronized (typically BT follows LTE through piconet clock adjustment feature). By contrast, the coordinated scheduling of the Bluetooth and WiFi communications may be referred to by the same name but it instead provides a method and apparatus to handle the Bluetooth and WiFi coexistence problem. Unlike the LTE coexistence case where there is a repetitive 10 ms frame structure and the Bluetooth system attempts to adapt the Bluetooth traffic to the LTE traffic, WiFi does not have such properties.

WiFi works on ad-hoc fashion and can adjust itself to Bluetooth system's slot mask. The Bluetooth slot available mask that is defined in SIG 5.0 is to peer a Bluetooth device which works on the common piconet clock. The slot mask/airtime pattern for WiFi is translated to a system clock that WiFi is able to understand. Since the chip's system clock might not sync up with piconet clock, the mask or airtime pattern change/drift over the time.

The coordinated scheduling of the Bluetooth and WiFi communications creates and regulates Bluetooth traffic patterns and let's WiFi transmissions adapt to the known Bluetooth traffic/airtime pattern.

Figure 4:
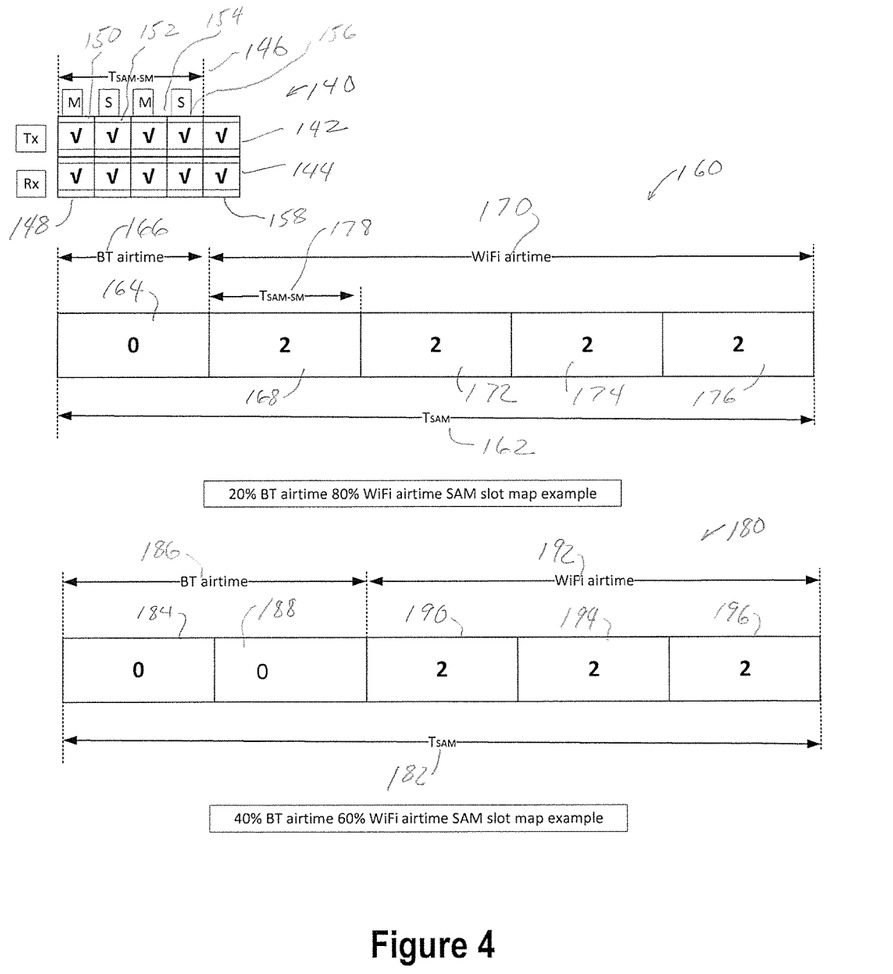
FIG. 4 is a schematic diagram showing changes in allotments of airtime between the Bluetooth and WiFi systems.

An example of allocation of airtime between a WiFi system and a Bluetooth system is shown in FIG. 4. FIG. 4 shows a submap 140 that includes a transmit row 142 and a transmit row 144. A time frame $T_{SAM\text{-}SM}$ 146 encompasses four slots 148 as indicated by the columns. The first column 150 is marked M for a master and includes check marks in both the transmit and receive rows. The second column 152 is marked S for slave operation and includes check marks to show that both transmit and receive operations are permitted. The third column 154 is marked M for master operation, with both transmit and receive operations enabled. The fourth column 156 is marked S for slave device operations with both transmit and receive operations enabled. A fifth column 158 is beyond the time frame 146 and shows transmit and receive functions are enabled.

Below the submap 140 is a first slot allocation mask 160. Five time slots are provided in the time $T_{SAM}$ 162. The first time slot 164 is marked as type 0 and allocated to Bluetooth communications as indicated at 166. A second time slot 168 is marked as a type 2 and is allocated to WiFi communications as indicated at 170. The third, fourth, and fifth time slots 172, 174 and 176 are also indicated as type 2 and allocated for WiFi communications. Each time slot has a length of $T_{SAM\text{-}SM}$ as indicated at 178. The slot allocation mask 160 allocates 20% of the airtime to Bluetooth communications and 80% of the airtime to WiFi communications, in this example.

Another example of a slot allocation mask 180 extends over a time $T_{SAM}$ as indicated at 182. A first time slot 184 is marked as a type 0 time slot and is allocated for Bluetooth communications as indicated at 186. A second time slot 188 is a type 0 time slot and is also allocated to Bluetooth communication. The third time slot 190 is a type 2 time slot and is allocated to WiFi communication as indicated at 192. The fourth time slot 194 and fifth time slot 196 are both indicated as type 2 time slots and are allocated to WiFi communications. The slot allocation mask 180 shows that 40% of the airtime is allocated to Bluetooth communications and that 60% of the airtime is allocated to WiFi communications. The allotment of time as between the Bluetooth communications and WiFi communications may be changed as needed so that each may be allotted more or less of the total time, including allotting all of the airtime to one of the communications systems for some time when needed.

Figure 1A:
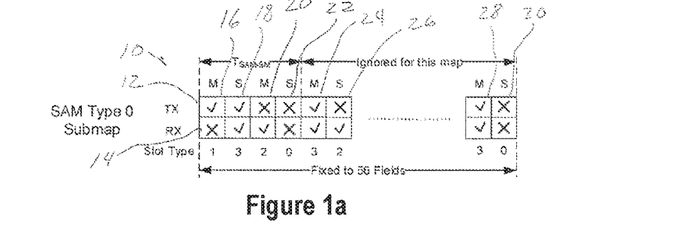
FIGS. 1a, 1b and 1c are a schematic diagrams showing allocation of available slots for wireless communications defined by the Bluetooth SIG Slot Available Mask feature.
Figure 1B:
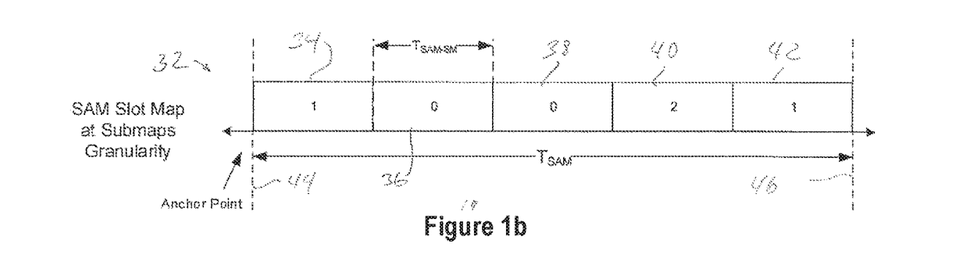
Figure 1C:
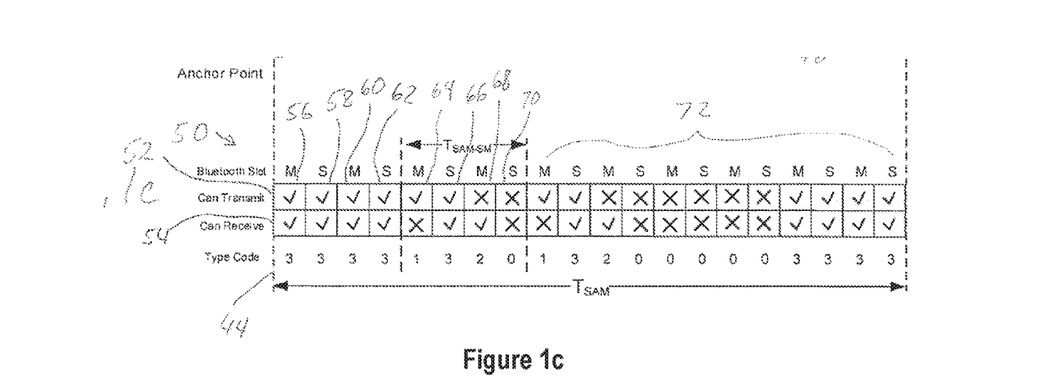

An example of a slot available map is shown in FIGS. 1a, 1b, and 1c. FIG. 1a shows a submap 10 for communications between a master device and a slave device. The upper row 12 of the submap 10 is designated for transmitting as indicated by the label TX and the lower row 14 is designated for receiving as indicated by the label RX. The rows 12 and 14 are divided into columns that correspond to time slots. A first column 16 is labeled M to indicate operations by the master device. The first column 16 in the transmit row 12 is provided with a check mark to indicate that the master device may transmit during that time slot. The first column 16 in the receive row 14 is marked with an X to indicate that the master device does not receive during that time slot. The first column 16 is indicated to be a type 1 time slot. The second column 18 is marked with an S to indicate actions by the slave device. The second column 18 transmit row 12 is marked with a check mark to indicate that the slave device may transmit during this time slot. The second column 18 receive row 14 is also marked with a check mark to indicate that the slave device may receive during this time slot. The second column 18 is marked to indicate that it is a type 3 column.

The third column 20 is marked with an M to show operations by the master device. The transmit row 12 of the third column 20 is marked with an X to show that the master device does not transmit during this time slot. The receive row 14 of the third column 20 is marked with a check mark to show that the master device does receive during this time slot. The third column is a type 2 column. The fourth column 22 is marked with an S to show operations by the slave device. The transmit row 12 of the fourth column 22 is marked with an X and the receive row 14 of the fourth column 22 is marked with an X to show that neither transmit nor receive functions are performed by the slave device. The column is a type 4 time slot. The first four columns or time slots are shown as type 1, 3, 2 and 0 in order. Together the four time slots make up a $T_{SAM-SM}$ time frame or duration. The remaining time slots include a type 3 slot 24 for the master device M, and next a type 2 slot 26 for the slave S device, with further time slots not indicated until slots 28 and 30, which are type 3 master M and type 0 slave S slots, respectively. A total of 56 fields is indicated in the submap 10, although only the first four time slots are used and the remaining slots of the 56 fields are ignored for this map. The submap 10 of FIG. 1 is a SAM (slot availability mask) type 0 submap.

Referring to FIG. 1b, a SAM (slot availability mask) slot map 32 is shown. The slot map 32 includes a first segment 34 that has a length corresponding to the length of the first four time slots 16-22 of the submap 10. The segment 34 is indicated as 1 which indicates that 1 the slots are available as defined in 190 of FIG. 5. A second segment 36 that is of the same length and is indicated as having a $T_{SAM-SM}$ duration. The second segment is marked as 0 which means that the individual slot follows definition defined in submap 10. Three additional segments 38, 40 and 42 are shown, marked with 0, 2 and 1 respectively. Together the five segments 34-42 provide the slot map for a duration $T_{SAM}$, which begins at an anchor point as indicated by dashed line 44 and extends to dashed line 46 The SAM slot map 32 is shown as submaps granularity.

FIG. 1c shows the Bluetooth slot mask 50 which is generated based on FIG. 1a and FIG. 1b. From the anchor point 44 extends a can transmit row 52 and a can receive row 54. The rows 52 and 54 are divided into columns with the first column 56 marked as M for the master device and showing check marks for affirmative operation in both the transmit and receive rows 52 and 54. The column 56 is a type 3 time slot. The next column 58 is a slave device column that is a type 3 time slot with both transmit and receive rows containing check marks. The third column 60 is a master time slot of type 3. The fourth column 62 is a slave time slot of type 3. The four columns 56-62 are of duration $T_{SAM-SM}$.

The next four columns 64, 66, 68 and 70 are alternating master and slave columns and are of type 1, 3, 2 and 0, respectively. These are also of duration $T_{SAM-SM}$. Twelve further columns or time slots indicated collectively as 72 are marked as alternating master and slave Bluetooth slots with the types shown as 1, 3, 2, 0, 0, 0, 0, 0, 3, 3, 3, and 3. Altogether, there are twenty columns or slots in the time $T_{SAM}$.

The FIG. 1c indicates where master and slave devices can communicate with each other and in which slots it can transmit and receive. It gives time reference of the map 50 as the anchor point 44. It also provides a scheme at the sub-map granularity (FIG. 1b) to overwrite the underlying slot map to handle a situation similar to when an LTE system is under a Discontinuous Reception (DRX) period where all the slots are free to transmit and receive.

Figure 2:
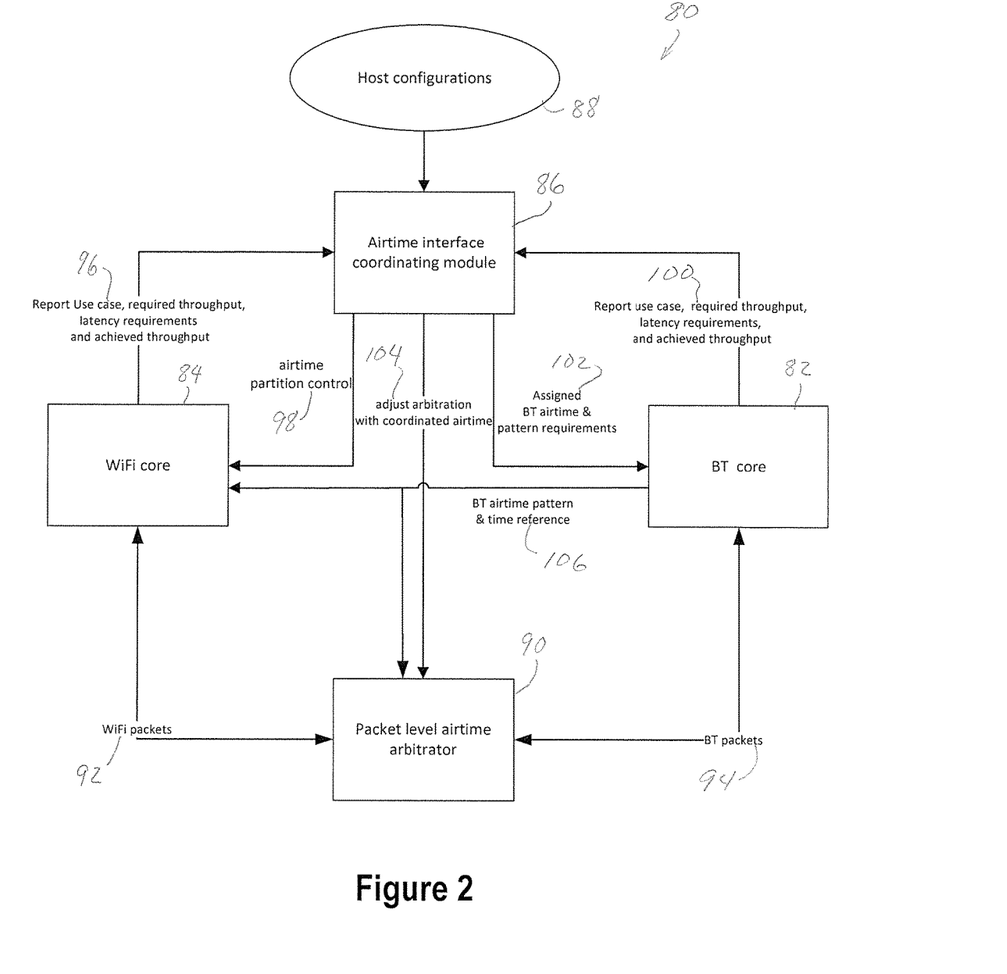
FIG. 2 is a functional block diagram showing a wireless communication system using Bluetooth and WiFi technology including coordinating the airtime partitions.

The system diagram 80 of the coordinated scheduling apparatus is shown in FIG. 2. Both a Bluetooth system core 82 (labeled BT core) and a WiFi system core 84 report their respective use case and required throughput and latency requirements to an airtime interface coordinating module 86. The airtime interface coordinating module 86 takes both the requirements from the Bluetooth core 82 and WiFi core 84 and also takes into account a host device configuration 88 to decide how to partition the air time between Bluetooth communications and the WiFi communications. The airtime interface coordinating module 86 generates and outputs airtime assignments and pattern requirements based on the requests. For Bluetooth and WiFi use cases like file transfers which don't have hard latency requirements, the host configuration 88 can greatly affect the final outcome.

The airtime interface coordinating module 86 can sit together with the Bluetooth core 82 or with WiFi core 84. In other words, the airtime interface coordinating module may be physically located with either the Bluetooth core 82 or with WiFi core 84 or may be located separately within the host device.

Once the Bluetooth core 82 receives the airtime assignment and pattern requirements from the airtime interface coordinating module 86, the Bluetooth core 82 will generate the local slot available mask map with the consideration of a remote device slot available mask map, if it exists. In particular, the Bluetooth core 82 will check for a slot available map from a remote device. The Bluetooth core 82 may avoid conflicts with the remote map, if any, while generating a local map that takes into account the airtime assignment and pattern requirements for the local device. The resulting map of the airtime pattern together with a time reference for the pattern are sent to both WiFi core 84 and to packet level airtime arbitrator 90.

The WiFi core 84 by default is set with airtime partitioning disabled. Unless told differently, the WiFi core 84 may assume that all of the airtime is available for WiFi use. Once the WiFi core 84 receives the airtime partition and Bluetooth airtime pattern from the Bluetooth core 82, WiFi core knows exactly when Bluetooth core 84 will not be transmitting wireless traffic. The WiFi core schedules its packet lengths to fill the airtime gaps between Bluetooth allocated airtime slots. The WiFi core 84 might also take an opportunistic approach to schedule WiFi traffic during Bluetooth allocated airtime, if needed. However, the packet level airtime arbitrator 90 will give Bluetooth packet higher priority if a conflict occurs.

WiFi packets 92 are provided to the WiFi core 84 and to the packet level airtime arbitrator 90. Bluetooth packets 94 are provided to both the Bluetooth core 82 and to the packet level airtime arbitrator 90. The WiFi core 84 sends to the airtime interface coordinating module 86 a report on the use case, the required throughput and the latency requirements as well as the achieved throughput, as indicated at 96. In return, the airtime interface coordinating module 86 sends to the WiFi core 84 an airtime partition control as indicated at 98. The Bluetooth core 82 sends a report of the use case, the required throughput and the latency requirements as well as the achieved throughput to the airtime interface coordinating module 86 as indicated at 100. The reported information at 96 and 100 included information on the use case, the needed airtime for the ideal case for an initial airtime partition, and a report on the actual airtime used. In return, the airtime interface coordinating module 86 sends assigned Bluetooth airtime and pattern requirements as indicated at 102 to the Bluetooth core 82. The airtime interface coordinating module 86 sends adjustments for arbitration with coordinated airtime as indicated at 104 to the packet level airtime arbitrator 90. The Bluetooth core 82 send Bluetooth airtime pattern and time reference information as indicated at 106 to the WiFi core 84 and to the packet level airtime arbitrator 90.

Figure 3:
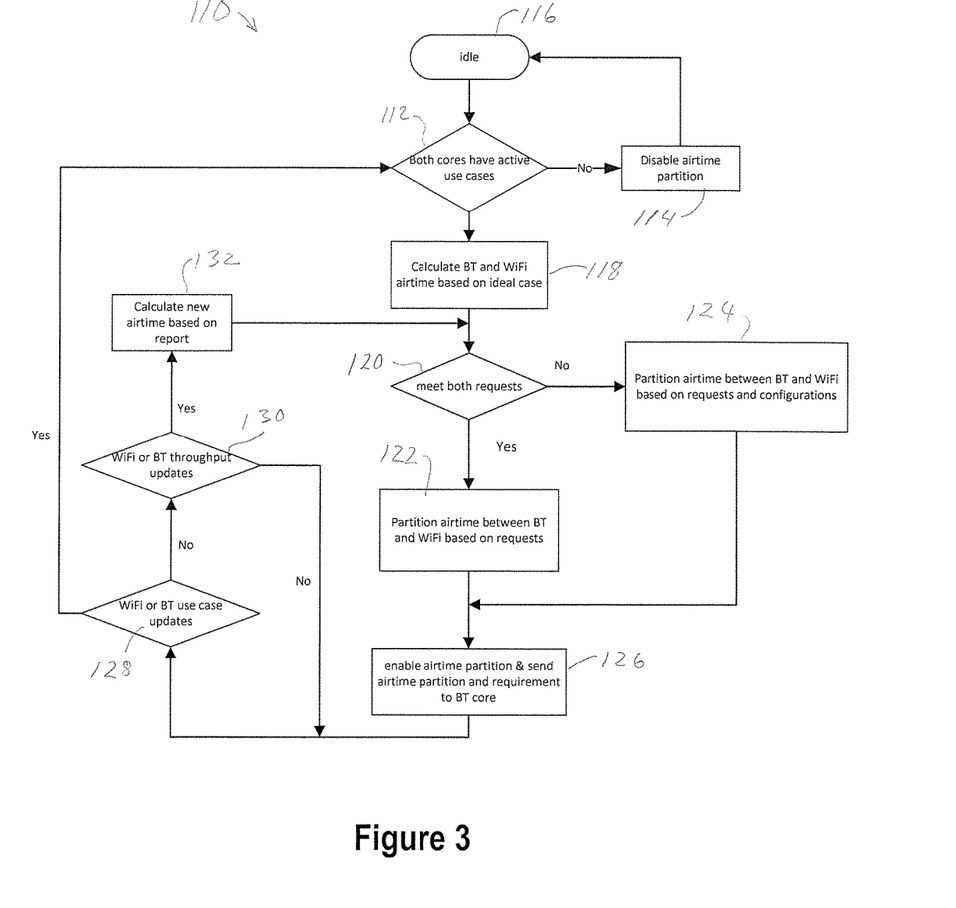
FIG. 3 is a flow chart showing the process for coordinating Bluetooth and WiFi scheduling.

A processing diagram 110 of the airtime interface coordinating module 86 is shown in FIG. 3. When both the Bluetooth system and the WiFi system report active use cases as shown at 112, the coordinated scheduling apparatus and method enables the airtime partitioning scheme. When either the WiFi core 84 or the Bluetooth core 82 is disabled or becomes inactive, the module 86 disables the airtime partition as shown at 114 and allows the active core 82 or 84 to take the full bandwidth of the airtime interface. The coordinated scheduling system is at an idle condition, at 116.

During an initial stage when both cores 82 and 84 are entering an active use case as reported at 112, the module 86 uses an ideal channel condition to decide the airtime needed for each core, as shown at 118. Each core 82 and 84 periodically monitors the throughput it achieved during the assigned airtime and reports back to the airtime interface coordinating module 86. If there is sufficient bandwidth to meet both requests as indicated at 120, the module 86 will partition the airtime based on the ratio of the requests as indicated at 122. If there is not enough bandwidth to meet both requests at 120, the system will take into account the reported throughput vs achieved throughput as well as the host configuration based on the use cases to partition the airtime, as shown at 124. For example, if the WiFi core 84 already uses half of the airtime interface and can only achieve 20% of its desired throughput, there is no incentive to further expand WiFi's airtime at the expense of degrading the Bluetooth core's performance. For a use case that don't have a hard latency requirement, the host configuration 88 can be used to decide how much each core 82 and 84 can yield to the other core on the airtime.

For example, if the WiFi core 84 shows marginal throughput performance while the Bluetooth core 82 has additional capacity due to different channel conditions or a running profile without a latency requirement, the system will recalculate the airtime partition to make the system serves both use cases well.

Referring to the diagram 110, the Bluetooth and WiFi airtime is calculated based on an ideal case at 118. If the requirements for both the Bluetooth and WiFi cores are met at 120, the partitioning of the airtime between the Bluetooth and WiFi communications is based on the requests. The airtime partition is enabled and the airtime partition and requirement is sent to the Bluetooth core at 126. An inquiry is made as to whether there are any use case updates for the Bluetooth and WiFi use cases at 128. If no updates in the use cases are found, then an inquiry is made as to whether there are any throughput updates for the Bluetooth and WiFi cores at 130. If no throughput updates are found, the process continues checking for use case updates 128 and throughput updates 130.

If a use case update is found at 128, the system returns to 112 where the inquiry is made as to whether both cores have an active use case. If not, the airtime partition is disabled at 114 and the system becomes idle at 116. If there is still active use cases for both cores, the calculation, or recalculation, is made at 118, an inquiry is made as to whether both requests are met by an ideal case at 120 and a partition based on the requests are provided at 122 and enabled at 126.

If no use case update is found at 128 but a throughput update is found at 130, then a calculation of new airtime is performed based on the reported throughput at 132. The new calculation at 132 is checked to see if both requests are met at 120, the airtime is partitioned at 122 and the partition is enabled at 126. If the determination at 120 finds that the requests are not both met by an ideal case, the airtime is partitioned between Bluetooth and WiFi communications based on the requests and the host configuration, at 124.

Figure 5:
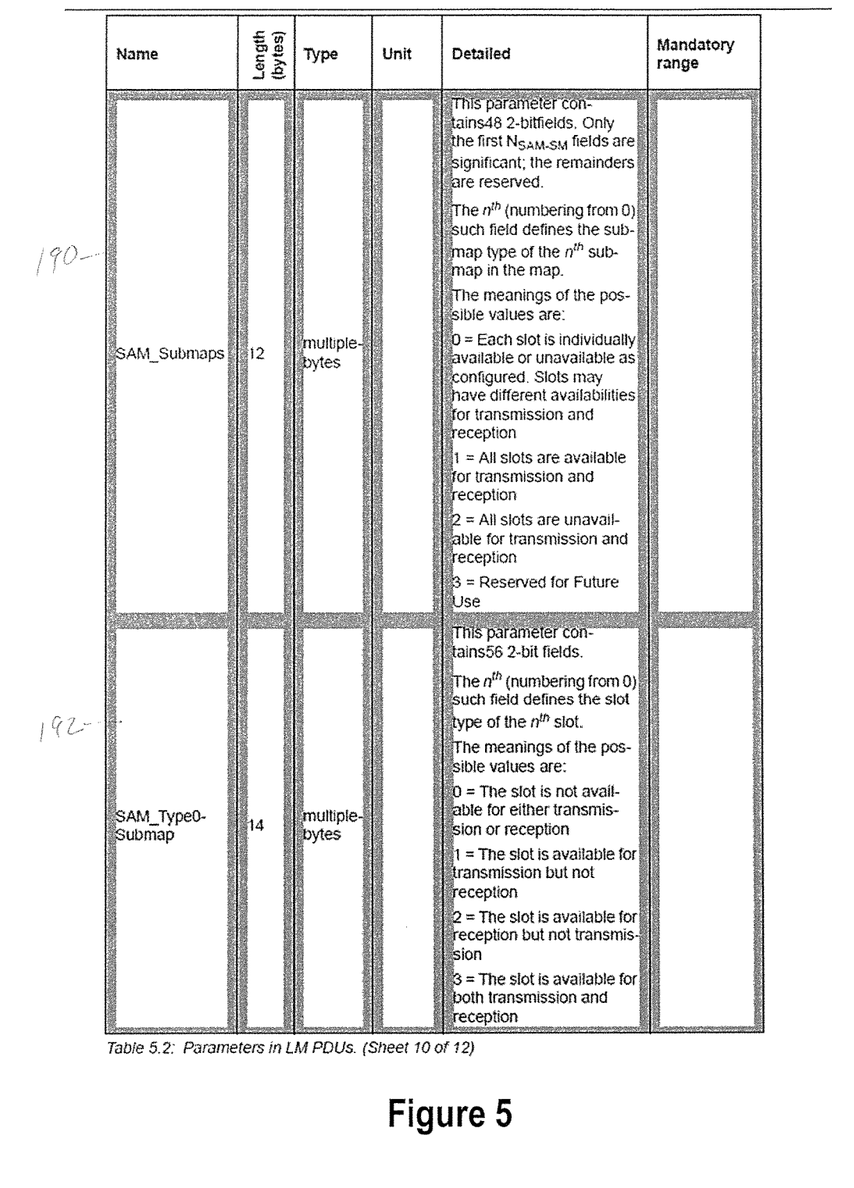
FIG. 5 is a table showing slot characteristics using the slot map defined in the Bluetooth SIG.

FIG. 5 is a table showing characteristics of slot allocation mask submaps. In row 190, slot allocation mask submaps are defined has having a length of 12 bytes and are of a type having multiple bytes. This parameter contains 48 2-bit fields. Only the first $N_{SAM-SAM}$ fields are significant, the remainders are reserved. The $n^{th}$ such field defines the sub-map type of the $n^{th}$ sub-map of the map. The possible values and their meanings are as follows. 0=Each slot is individually available or unavailable as configured. Slots may have different availabilities for transmission and reception. 1=All slots are available for transmission and reception. 2=All slots are unavailable for transmission and reception. 3=Reserved for future use.

As shown at 192, a slot allocation mask Type 0 submap may have 14 bytes and is of a type having multiple bytes. This parameter contains 56 2-bit fields. The $n^{th}$ such field defines the slot type for the $n^{th}$ slot. The possible values and their meanings include: 0=the slot is not available for either transmission or reception. 1=The slot is available for transmission but not reception. 2=The slot is available for reception but not transmission. 3=The slot is available for both transmission and reception.

A system and method as described herein may provide a better coexistence user experience in for devices which use two wireless communication systems, such as WiFi and Bluetooth. The present method and system may provide less connection loss for both WLAN and Bluetooth, especially when there are multiple Bluetooth devices (including classic Bluetooth and/or Bluetooth smart BLE devices) and WiFi devices (including STA connection and WiFi direct service enabled devices) connected to the same device which contain the present WLAN/BT combo solution.

In a first aspect, a method for coordinating communications of a first wireless communication system of a device and a second wireless communication system of the device, comprising: collecting requests for airtime from the first wireless communication system for first wireless communications to be carried out by the device; collecting requests for airtime from the second wireless communication system for second wireless communications to be carried out by the device; generating a local slot availability mask for the first wireless communications, the slot availability mask identifying time slots when the first wireless communications occur; and providing the local slot availability mask to the second wireless communication system to avoid second wireless communications in time slots identified in the local slot availability mask as when the first wireless communications occur.

In a second aspect, a method of a first aspect, wherein the first wireless communication system is a Bluetooth system and the second wireless communication system is a WiFi system.

In a third aspect, a method of a first aspect, further comprising: sending the first wireless communications during time slots allocated by the local slot availability mask to the first wireless communications; and sending second wireless communications during time slots allocated by the local slot availability mask to the second wireless communications.

In a fourth aspect, a method for coordinating wireless Bluetooth and WiFi communications by a device, comprising: collecting requests for airtime for Bluetooth communications by the device; generating a local slot availability mask for the Bluetooth system when Bluetooth communications occur; providing the local slot availability mask to the WiFi system to avoid WiFi communications in time slots when Bluetooth communications occur; and sending Bluetooth communications in time slots allocated for Bluetooth communications by the local slot availability mask.

In a fifth aspect, a method of the fourth aspect, further comprising: collecting requests for airtime from a WiFi system in the device; and considering the WiFi system airtime requests when generating the local slot vailability mask.

In a sixth aspect, a method of the fifth aspect, further comprising: changing the proportion of time slots allotted to the Bluetooth communications compared to the time slots allocated to the WiFi communications depending on the priority of the communications to be carried by the Bluetooth communications and the WiFi communications, respectively.

In a seventh aspect, a method of the fourth aspect, further comprising: sending WiFi communications during times allocated to the WiFi communications.

In an eighth aspect, a method of a seventh aspect, further comprising: sending WiFi communication by the WiFi system during times allocated to the Bluetooth communications, as needed.

In a ninth aspect, a method of a fourth aspect, wherein the device is a first device, and further comprising: communicating the local slot availability mask from the first device to a second device with which the first device may communicate wirelessly.

In a tenth aspect, a method of the first aspect, wherein the device is a first device, and further comprising: receiving a remote device available mask map from a second device; and considering the remote device available mask map when generating the local slot available mask.

In an eleventh aspect, a method of the first aspect, wherein the local slot available mask is generated only an airtime request is received from the Bluetooth system; otherwise, allocating all of the airtime to the WiFi system.

In a twelfth aspect, an apparatus for allocating airtime in a wireless communication system, comprising: a first wireless communication core for first wireless communications, the first wireless communication core being operable to receive first wireless packets; a second wireless communication core for second wireless communications, the second wireless communication core being operable to receive second wireless packets; an airtime interface coordinating module operable to coordinate communications between the first and second wireless communication cores, the airtime interface coordinating module being operable to receive priority information relating to the first and second wireless packets from the respective first and second wireless communication cores, and transmit assigned second wireless communication airtime to the second wireless communication core; wherein the second wireless communication core being operable to generate a second wireless communication airtime pattern and to transmit the second wireless communication airtime pattern to the first wireless communication core; a packet level airtime arbitrator being operable to receive the second wireless communication airtime pattern from the second wireless communication core and to receive the first and second wireless packets.

In a thirteenth aspect, an apparatus of the twelfth aspect, wherein the first wireless communication is WiFi communication and the second wireless communication is Bluetooth communication.

In a fourteenth aspect, an apparatus of the twelfth aspect, wherein the airtime interface coordinating module is operable to adjust arbitration with coordinated airtime.

In a fifteenth aspect, a method for operating a wireless communication system capable of first and second wireless communication, comprising: determining if cores for the first and second wireless communications comprises active use cases; partitioning airtime between the first and second wireless communications by allocating first slots to the first wireless communications and allocating second slots to the second wireless communications; communicating the allocation of the first and second slots to the cores of the first and second wireless communications based on the active use cases; performing first wireless communications during the first slots and performing the second wireless communications during the second slots.

In a sixteenth aspect, a method of the fourteenth aspect, further comprising: performing first wireless communications during the second slots as needed by the first wireless communications.

In a seventeenth aspect, a method of the fifteen aspect, wherein the first wireless communication is WiFi communication and wherein the second wireless communication is Bluetooth communication.

In an eighteenth aspect, a method of the fifteenth aspect, further comprising: updating at least one of the use cases for at least one of the first and second wireless communications; calculating a updated airtime allocations according to the updated use case; communicating the updated airtime allocations to the cores; and performing the first wireless communications and the second wireless communications according to the updated airtime allocations.

In a nineteenth aspect, a method of a fifteenth aspect, further comprising: receiving a throughput update for at least one of the first and second wireless communications; calculating an updated airtime allocation according to the updated throughput; communicating the updated airtime allocations to the cores; and performing the first wireless communications and the second wireless communications according to the updated airtime allocations.

In a twentieth aspect, a method for allocating airtime between WiFi communication and Bluetooth communication, comprising: receiving a first use case for the WiFi communication from a WiFi core; receiving a second use case for the Bluetooth communication from a Bluetooth core; calculating an allocation of time slots between the WiFi communication and the Bluetooth communication if the first and second use cases are received; sending a first allocation of time slots to the Bluetooth core; sending the first allocation of time slots from the Bluetooth core to the WiFi core; performing Bluetooth communications during the first allocation of time slots; performing WiFi communications during the second allocation of time slots.

In a twenty-first aspect, a method of the twentieth aspect, further comprising: performing WiFi communications during time slots allocated to the Bluetooth communications as needed.

In a twenty-second aspect, a method of the twentieth aspect, further comprising: reporting throughput for the WiFi and Bluetooth communications; calculating a new airtime allocation based on the reported throughput; sending the new airtime allocation from the Bluetooth core to the WiFi core; performing Bluetooth communications during time slots allocated to the Bluetooth communications according to the new airtime allocation; and performing WiFi communications during time slots allocated to the WiFi communications according to the new airtime allocation.

In a twenty-third aspect, a method of a twentieth aspect, wherein the WiFi core and the Bluetooth are collocated in a mobile device.

In a twenty-fourth aspect, a method of the twentieth aspect, further comprising: determining priority between the WiFi communication and the Bluetooth communication by traffic type; allocating the time slots to the WiFi communication and the Bluetooth communication based on the priority determination.

In a twenty-fifth aspect, a method of the twentieth aspect, further comprising: receiving an update to a third use case for at least one of the WiFi communication and the Bluetooth communication; changing the first and second allocation of time slots based on the update to provide an updated allocation; sending the updated allocation of the first and second allocation of time slots to the Bluetooth core; sending the updated allocation of the first and second allocation of time slots from the Bluetooth core to the WiFi core; performing Bluetooth communications during the updated allocation of the first allocation of time slots; and performing WiFi communications during the updated allocation of second allocation of time slots.

In a twenty-sixth aspect, an apparatus for coordinated Bluetooth communication, comprising: a device; and a Bluetooth core in the device operable to transmit a use case for Bluetooth communication to a coordinating module, the Bluetooth core being operable to receive an allocation mask from the coordinating module, the allocation mask including allocations of time slots for Bluetooth communications and allocations of time slots for WiFi communications, the Bluetooth controller being operable to transmit Bluetooth communications during the time slots allocated to Bluetooth communications.

In a twenty-seventh aspect, an apparatus for coordinated WiFi communication, comprising: a device; and a WiFi core in the device operable to transmit a use case for WiFi communication to a coordinating module, the WiFi core being operable to receive an allocation mask including allocations of time slots for Bluetooth communications and allocations of time slots for WiFi communications from a Bluetooth core, the WiFi core being operable to transmit WiFi communications during time slots allocated to WiFi communications.

In a twenty-eighth aspect, a system for coordinated communication of Bluetooth and WiFi communications, comprising: a housing; a battery in the housing; an antenna in the housing; a wireless transmitter in the housing and connected to the antenna; an allocation module in the housing; a Bluetooth core connected to the allocation module and operable to transmit a Bluetooth use case to the allocation module; a WiFi core connected to the allocation module and operable to transmit a WiFi use case to the allocation module; the allocation module being operable to generate an allocation mask based on the Bluetooth use case and the WiFi use case, the allocation module being operable to transmit the allocation mask to the Bluetooth core; the Bluetooth core being operable to transmit the allocation mask to the WiFi core, the Bluetooth core being operable to perform Bluetooth communications according to the allocation mask; and the WiFi core being operable to perform WiFi communications according to the allocation mask.

While the foregoing has been described in conjunction with exemplary aspects, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method for coordinating communications of a first wireless communication system of a device and a second wireless communication system of the device, comprising:
   collecting requests for airtime from the first wireless communication system for first wireless communications to be carried out by the device;
   collecting requests for airtime from the second wireless communication system for second wireless communications to be carried out by the device;

generating a local slot availability mask for the first wireless communications, the slot availability mask identifying time slots when the first wireless communications occur;

providing the local slot availability mask to the second wireless communication system to avoid second wireless communications in time slots identified in the local slot availability mask as when the first wireless communications occur;

communicating over the first wireless communication system and the second wireless communication system according to the local slot availability mask;

determining channel conditions of the second wireless communication system;

changing an allocation of slots for the first wireless communications in local slot availability mask based on the determined channel conditions of the second wireless communication system; and communicating over the first and second wireless communication systems according to the changed local slot availability mask.

2. A method as claimed in claim 1, wherein the first wireless communication system is a Bluetooth system and the second wireless communication system is a WiFi system.

3. A method as claimed in claim 1, further comprising:
sending the first wireless communications during time slots allocated by the local slot availability mask to the first wireless communications; and
sending second wireless communications during time slots allocated by the local slot availability mask to the second wireless communications.

4. A method as claimed in claim 1, wherein the device is a first device, and further comprising:
receiving a remote device available mask map from a second device;
considering the remote device available mask map when generating the local slot available mask for the first device;
communicating the local slot available mask that includes airtime assignments for the local device and for the remote device to the second communication system; and
communicating via the first and second communication systems of the first device using the local slot available mask that includes airtime assignments determined by the remote device.

5. A method for coordinating wireless Bluetooth and WiFi communications by a device, comprising:
collecting requests for airtime for Bluetooth communications by the device;
generating a local slot availability mask for the Bluetooth system when Bluetooth communications occur;
providing the local slot availability mask to the WiFi system to avoid WiFi communications in time slots allocated for Bluetooth communications by the local slot availability mask;
sending Bluetooth communications in time slots allocated for Bluetooth communications by the local slot availability mask and sending WiFi communications in time slots allocated for WiFi communications;
determining throughput of the WiFi communications sent during the time slots allocated for WiFi communications;
generating an adjusted local slot availability mask for the Bluetooth system based on the determined WiFi throughput;
providing the adjusted local slot availability mask to the WiFi system; and
sending Bluetooth communications in time slots allocated for Bluetooth communications by the adjusted local slot availability mask.

6. A method as claimed in claim 5, further comprising:
collecting requests for airtime from a WiFi system in the device; and
considering the WiFi system airtime requests when generating the local slot availability mask.

7. A method as claimed in claim 6, further comprising:
changing the proportion of time slots allotted to the Bluetooth communications compared to the time slots allocated to the WiFi communications depending on a priority of the communications by the Bluetooth communications and the WiFi communications, respectively;
changing the proportion of time slots allocated to the Bluetooth communications compared to the time slots allocated to the WiFi communications depending on channel conditions determined for WiFi communications for achieved throughput of WiFi communications; and
communicating using the Bluetooth communication system and the WiFi communication in the respective time slots according to the changed time slots.

8. A method as claimed in claim 5, further comprising:
sending WiFi communications during times allocated to the WiFi communications.

9. A method as claimed in claim 8, further comprising:
sending WiFi communication by the WiFi system during time slots allocated to the Bluetooth communications in the local slot availability mask, as needed.

10. A method as claimed in claim 5, wherein the device is a first device, and further comprising:
communicating the local slot availability mask from the first device to a second device with which the first device communicates wirelessly.

11. A method as claimed in claim 5, wherein the generating a local slot availability mask includes:
receiving a report on a use case, a required throughput, latency requirements, and achieved throughput of WiFi packets as WiFi packet information from the WiFi system;
receiving a report on a use case, a required throughput, latency requirements and achieved throughput of Bluetooth packets as Bluetooth packet information from the Bluetooth system;
generating adjustments to the local slot availability mask based on the reported WiFi packets and Bluetooth packets information;
sending the adjusted local slot availability mask to the Bluetooth system; and
using the adjusted local slot availability mask for WiFi and Bluetooth communications.

12. An apparatus for allocating airtime in a wireless communication system, comprising:
a first wireless communication core circuit for first wireless communications, the first wireless communication core circuit being configured and operable to receive first wireless packets;
a second wireless communication core circuit for second wireless communications, the second wireless communication core circuit being configured and operable to receive second wireless packets; and
an airtime interface coordinating module circuit being configured and operable to coordinate communications between the first and second wireless communication core circuits, the airtime interface coordinating module being configured and operable to receive priority information relating to the first and second wireless packets from the respective first and second wireless communication core circuits, and transmit assigned second wireless communication airtime to the second wireless communication core circuit, the airtime interface coordinating module being configured and operable to receive throughput information from the first and second wireless communication core circuits and being configured and operable to change allocation of airtime to the respective first and second wireless communication core circuits based on the received throughput information;

wherein the second wireless communication core circuit being configured and operable to generate a second wireless communication airtime pattern and to transmit the second wireless communication airtime pattern to the first wireless communication core circuit.

13. An apparatus as claimed in claim 12, wherein the first wireless communication is WiFi communication and the second wireless communication is Bluetooth communication.

* * * * *